United States Patent [19]

Chung

[11] Patent Number: 5,520,099
[45] Date of Patent: May 28, 1996

[54] SYSTEM OF COOKING OR HEATING FOOD PRODUCTS WITH MICROWAVES AND HOT OIL

[76] Inventor: Jing-Yau Chung, 13310 Pebblebrook, Houston, Tex. 77079

[21] Appl. No.: 296,731

[22] Filed: Aug. 26, 1994

[51] Int. Cl.[6] .................... A47J 37/12; H05B 6/80
[52] U.S. Cl. ................ 99/409; 99/418; 99/451; 99/516; 99/DIG. 14; 219/731
[58] Field of Search .................. 99/404, 409, 418, 99/451, DIG. 14, 516; 219/725, 728, 731, 732, 733

[56] References Cited

U.S. PATENT DOCUMENTS

| | | | |
|---|---|---|---|
| 2,997,566 | 8/1961 | Pierce et al. | 219/731 |
| 3,633,490 | 1/1972 | Schiffmann | 99/405 |
| 4,593,170 | 6/1986 | Maeda et al. | 99/403 |
| 4,882,984 | 11/1989 | Eves, II | 99/404 |
| 4,963,708 | 10/1990 | Kearns et al. | |
| 5,019,412 | 5/1991 | Hattori | 219/731 |

Primary Examiner—Timothy F. Simone
Assistant Examiner—Reginald L. Alexander
Attorney, Agent, or Firm—Mark A. Oathout

[57] ABSTRACT

The present invention provides a system for cooking and/or heating a food product rapidly with the use of microwave and hot oil heating, which are applied simultaneously during the entire or partial period of the cooking and/or heating time. The said food product may be frozen prior to processing, and may consist of an outer wrapper and an inner filling. It is desirable that after a relatively short cooking and/or heating process, the outer wrapper becomes crispy with a uniform golden-brown color while the inner filling reaches a desired temperature.

4 Claims, 6 Drawing Sheets

SYSTEM OF COOKING OR HEATING FOOD PRODUCTS WITH MICROWAVES AND HOT OIL

BACKGROUND OF THE INVENTION

Food manufacturers are constantly looking for a new improved method of preparing foods. In particular, a rapid and efficient method which also produces high quality foods is always desirable. Special problems, however, are encountered by manufacturers when hot oil heating (deep frying) is involved in cooking and/or heating food products such as egg rolls, pizza rolls, fried taco rolls, fried burritos, corn dogs or break fast rolls etc. which generally consists of a wrapper (outer shell/skin) and an inner filling. Such food items are difficult to cook and/or heat rapidly while at the same time, yielding desirable crispiness of the wrapper (outer shell/skin) and a high quality cooking and/or heating of the inner filler. In general, if a relatively high temperature is applied in the conventional deep-fry cooking and/or heating, the wrapper (outer shell/skin) becomes overcooked and burnt before the inner filling even reaches the desired temperature. This is particularly true when the products are frozen prior to processing.

When heating the somewhat cylindrical food products mentioned above by means of the conventional oil heating alone, it is known from experience in the applicant's egg roll manufacturing plant that for a product of one and one-half inches in diameter, the time required to reach the core temperature of 160 degrees fahrenheit(F.) from an initial temperature of 50 degrees F. is about five minutes with the oil temperature being maintained at 355 degrees F. If the same product is frozen prior to processing, it becomes impossible to obtain a satisfactory result by frying alone. For a thin and uniform food item such as french fries, it does not constitute a problem even if they are frozen prior to deep frying. But for the same frozen egg roll mentioned above with an initial temperature of 15 degrees F. and the same frying temperature, the time required to reach a core temperature of 160 degrees F. is about 10 minutes. This core temperature level is required by the U.S. Department of Agriculture meat and poultry inspection on items such as chicken egg rolls. At this frying time, however, the outer wrapper of the egg roll becomes burnt long before the core temperature reaches 160 degrees F. The present invention is a solution to the problem of cooking and/or heating a frozen or non-frozen food product in a relatively short time is to combine conventional oil heating and microwave heating simultaneously during the entire or partial period of the said cooking and/or heating time.

The microwave is widely used to cook and/or heat food products such as frozen dinners or even frozen egg rolls mainly for its relatively shorter heating time and for simplicity of operation. In the case of heating an egg roll for example, the use of microwave heating alone yields undesirable result. The microwave excites water molecules of the inner filling, thus generating heat and water vapor which causes the egg roll wrapper to become soggy. In general, a food product having a wrapper (outer shell/skin) and an inner filling with moisture cannot be cooked and/or heated satisfactorily with microwaves alone, if it is desired to have a crispy outer crust as the result of cooking and/or heating. This is also true, even for a food item with uniform inner and outer substances such as a french fry where a similar requirement, namely, "a crispy outer layer" is sought after cooking and/or heating.

The above argument supports the necessity of the present invention for using both conventional oil heating and microwave heating for a relatively rapid and better quality cooking and/or heating of a food product consisting of a wrapper (outer shell/skin) and an inner filling. It is apparent that a simultaneous application of the two heating methods will not only further reduce cooking and/or heating time, but also ensure the crispiness of the outer crust after said cooking and/or heating. It should be noted that in the case of cooking egg rolls (or other similar food products), it is not desirable to use microwave cooking prior to a conventional oil frying. An egg roll heated by microwaves yields a soggy egg roll wrapper, a soggy egg roll wrapper breaks easily during deep frying. The only workable method, in this case is to apply the two heating methods simultaneously.

SUMMARY OF TEE INVENTION

The present invention provides a system for cooking and/or heating a frozen or a non-frozen food product by means of combined microwave and conventional oil heating methods which are applied simultaneously during the entire or a partial cooking and/or heating period providing: (a) a rapid cooking and/or heating time and (b) a high quality fried product which gives a crispy outer crust (wrapper) or outer skin.

DETAIL DESCRIPTION OF THE INVENTION

Figure 1:
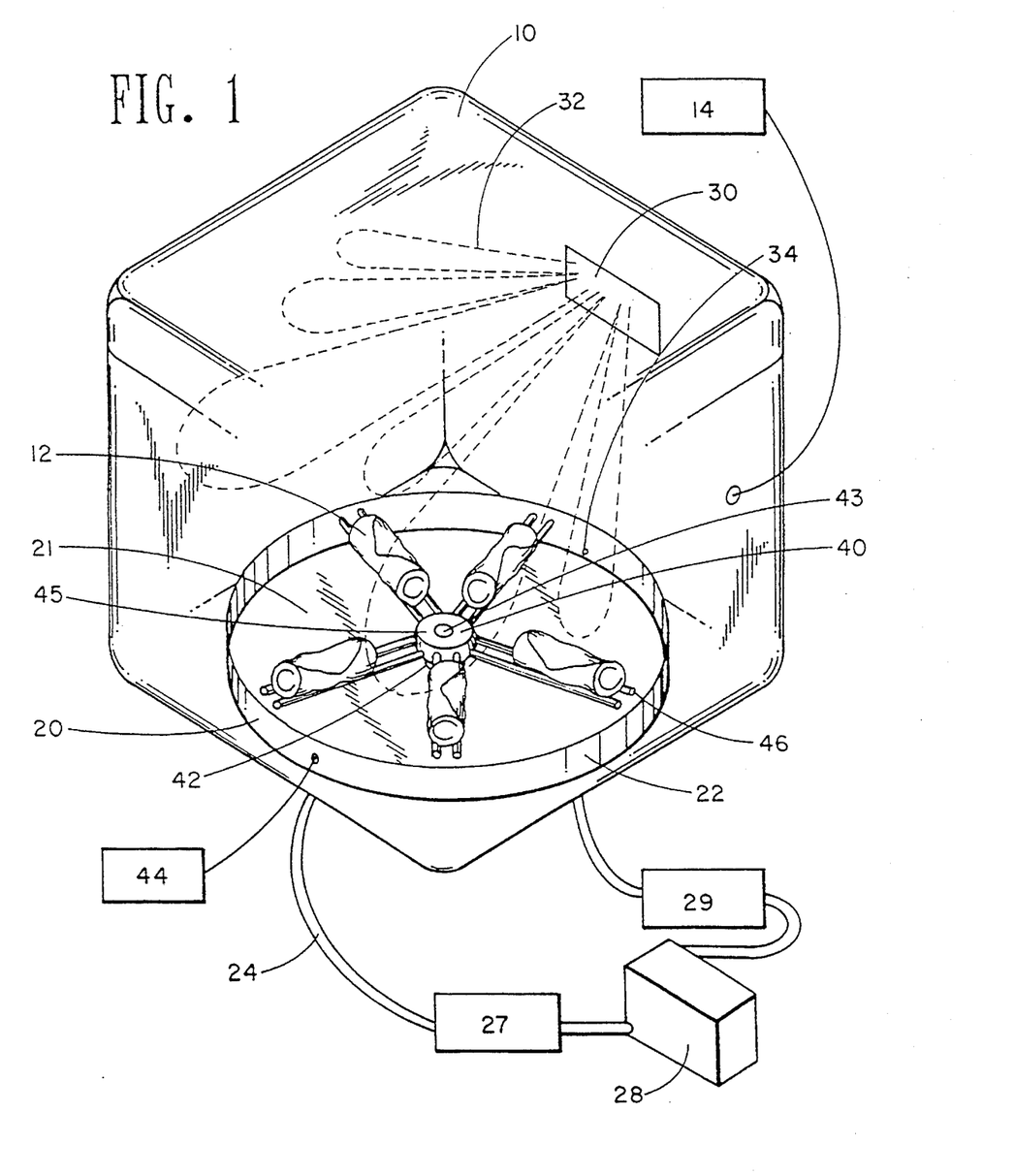
FIG. 1 illustrates an apparatus which may be used in the system of the invention with portions of the apparatus being shown in schematic form.
Figure 2:
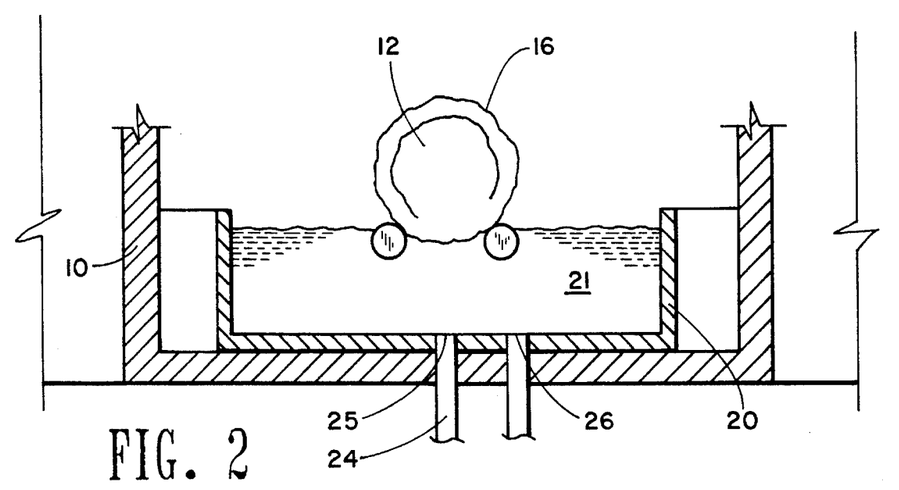
FIG. 2 is a cross-sectional elevational view of the system shown in FIG. 1.

Referring to FIGS. 1 and 2, the system of the present invention generally includes an oven body 10, a hot oil system 20 containing hot oil 21, and a microwave source/receiver 30. The embodiment of the invention may include a rotating tree 40 for moving the food product 12 through the heating medium (oil) while turning the product about its core axis.

The food product 12 is cooked and/or heated in the oven body (or heating chamber) 10 which normally includes a door (not shown). Prior to cooking and/or heating, the food product 12 comprises a raw or a pre-cooked product which may be frozen, refrigerated or at room temperature. The food product generally requires frying, which includes items such as a french fry, a dough-based product such as a donut, or a food product having an inner filling enclosed in an outer shell such as an egg roll shown in FIG. 2 with the outer wrapper 16. Other food items represented by 12 may include similar products such as pizza rolls, spinach rolls, fried taco rolls, fried burritos, corn dogs, breakfast rolls, fried pies and pastries etc. As mentioned above, the food product 12 in a raw or pre-cooked form is placed into the oven body 10 frozen, refrigerated or at room temperature. It is desirable to cook and/or heat the product rapidly and to obtain a high quality crispy outer crust with a desirable uniform color while the inner filling reaches a desirable temperature which, in the case of a meat or poultry item, must comply with USDA regulations. The problems encountered in processing such food items and some solutions to the problems are discussed in U.S. Pat. No. 4,844,920 which was issued to the present applicant on Jul. 4, 1989 and which is intended to be incorporated herein.

A control system 14 which includes a temperature sensor 34 is connected to the oven body 10, the hot oil system 20, the microwave source/receiver 30 and the revolving tree 40 to regulate variables such as cooking and/or heating time, temperature, rotating speed, etc. The components to be used in such a control system are those known to one having ordinary skill in the existing art. For example, a temperature sensor 34 is located inside the oil container 22 to register hot oil temperature for: (a) regulating the hot oil temperature and (b) monitoring the temperature and activating a safety shut-down in the event that the oil becomes over heated.

The hot oil system 20 includes an oil container 22. The oil container 22 contains hot oil 21 which is heated either by an external oil heater 28 or by the microwave or by both the oil heater and the microwave. The oil container 22 is constructed in such a way that the food product 12 can be fully or partially submerged in the hot oil 21 while rotating horizontally through the hot oil 21. An oil circulating line 24 having feed-throughs 25 and 26 connects the oil container 22 to the optional oil heater 28 with oil filter 27 and oil pump 29 at the inlet and the outlet sides of the oil heater 28 respectively. Other devices (not shown) may be added to the oil circulating line 24 to reduce the FFA (free fatty acids) in the oil.

The system of the present invention described above generally operates with the oven body 10, the hot oil system 20 consisting of the oil container 22 filled with hot oil 21 for the submersion of the food product(s) 12 and a control system 14 which includes a temperature sensor 34. It may also operate without the hot oil system 20 where the oil is heated directly by the microwaves. The system may also include an optional revolving tree 40. The revolving tree 40 generally includes a journal 42 with a drive shaft 43 which is driven by a variable speed motor 44. A hub 45 is connected to the top end of drive shaft 43. Hub 45 supports rollers 46. The rollers 46 are preferably grouped in parallel pairs to support the food product 12. By doing so, one roller of the said pair is in the radial direction with respect to the shaft 43, while the other is parallel to the aforementioned roller and in a slightly off-radial direction. The roller in the radial direction is driven by a gear in hub 45 or by the stationary oil container 22 and rotates about its own axis, while the roller in the off-radial direction is driven by the food product 12 whose rotational motion about its core axis is created by the roller in the radial direction. The roller pairs 46, however, rotate as a group about the drive shaft 43 to form a revolving tree 40. The rotation of the roller pairs about their own axis may be omitted as an alternative revolving tree system 40 in which the food product 12 is submerged completely in the hot oil. The roller pairs 46 are preferably on a horizontal plane in a "near-radial" direction with respect to the shaft 43 in order to support and to rotate the food product 12. The roller pairs 46 are generally spaced less than the diameter of the food product. The rollers 46 should be at a height below the top of the oil container 22 so that the food product 12 can be fully or partially submerged in the hot oil. The rollers may be made or coated with TEFLON or some other material which prevents the food product 12 from sticking to the rollers. In fact a material such as TEFLON is ideal to be used in the present system due to its workability in the microwave field as well as its working temperature range.

The microwave source/receiver 30 is connected anywhere within the oven body 10 and it produces a microwave field depicted by the field intensity contours 32. The microwave field 32 is preferably a relatively high intensity field to shorten the cooking and/or heating time.

Figure 3:
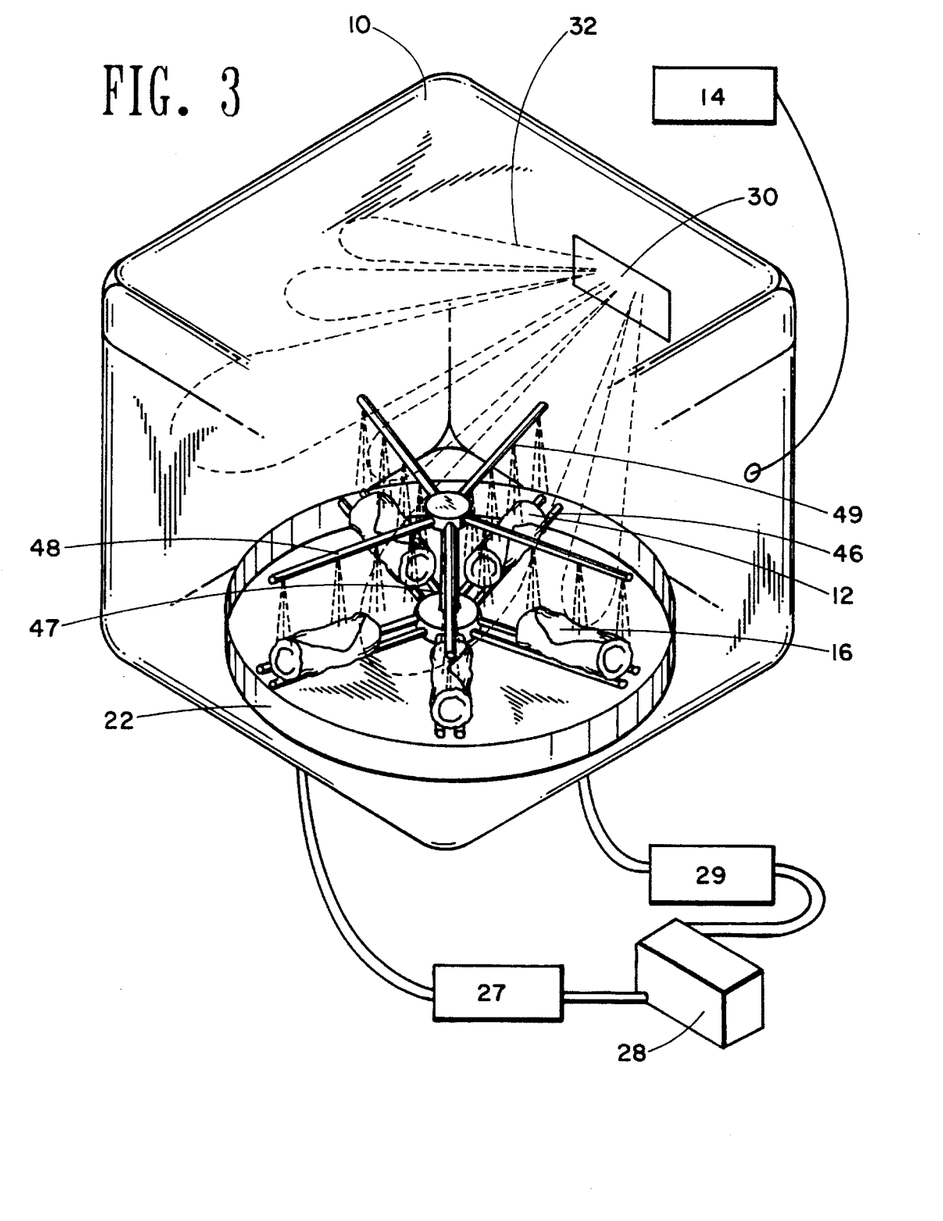
FIG. 3 is a view similar to FIG. 1 of another embodiment of the invention.

Referring to FIG. 3, another embodiment of the invention which is similar to that shown in FIG. 1 is represented. In addition to the features shown in FIG. 1, the embodiment shown in FIG. 3 includes an extension drive shaft 47 which is connected to the drive shaft shown in FIG. 1. The upper end of the extension drive shaft 47 supports a plurality of poles 48 which are positioned one each above the roller pairs 46. The poles 48 contain nozzles 49. A hot oil line (not shown) runs through drive shaft 43 and extension drive shaft 47 through poles 48 to the nozzles 49 for spraying hot oil over the food product 12.

Figure 4:
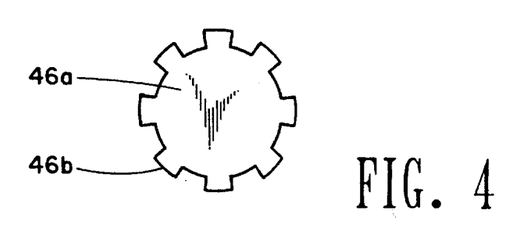
FIG. 4 is an end-view of another embodiment of a roller which can be used in the invention.

Referring to FIG. 4, if the rollers are to be driven about their axis, it may be desirable to have a roller 46a having teeth 46b to improve contact for turning the food product 12.

Figure 5:
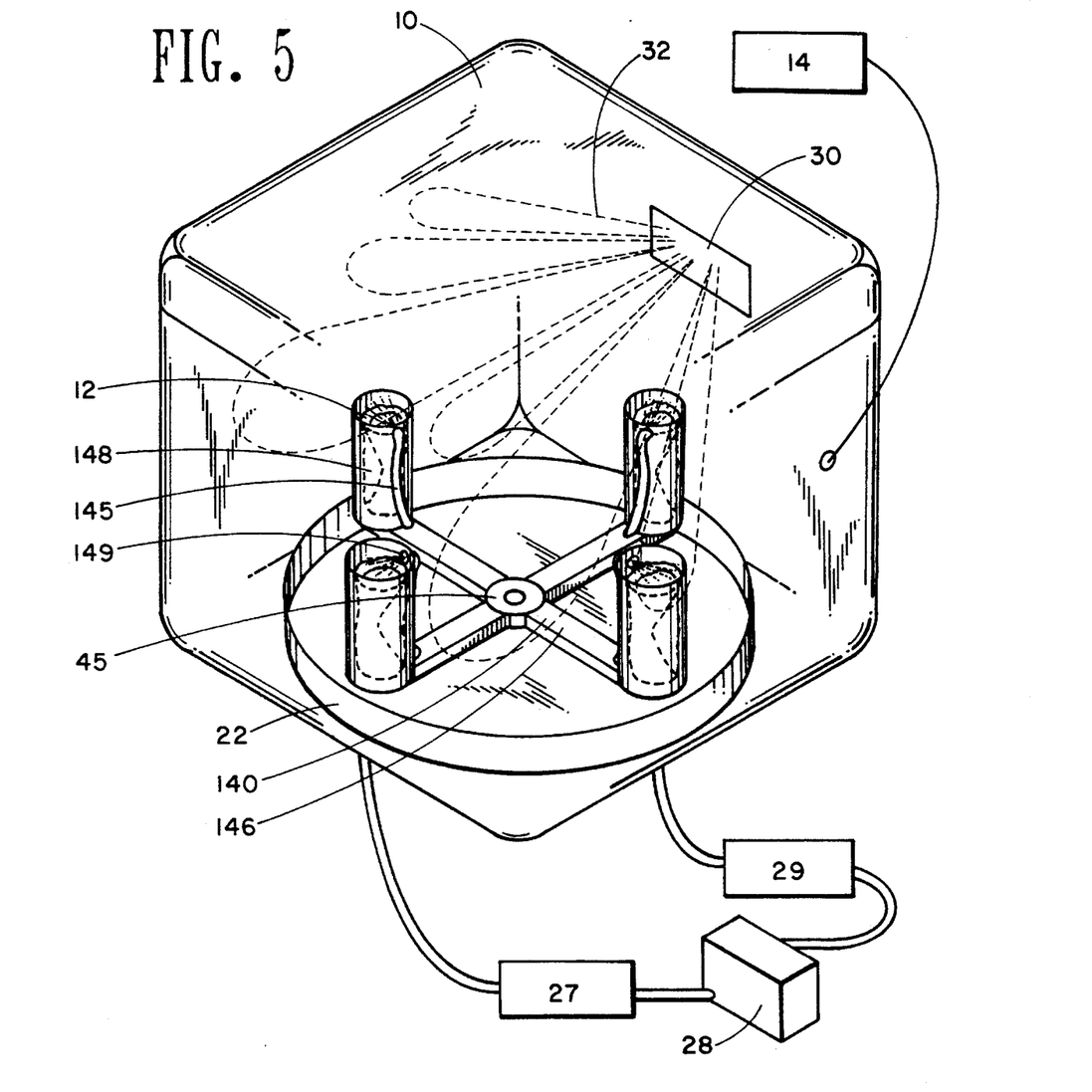
FIG. 5 is a view similar to FIG. 1 showing another embodiment of the invention.

The embodiment of the invention shown in FIG. 5 is similar to that shown in FIG. 1 except that in this embodiment, the revolving tree 140 includes arms 146 which extend from hub 45 on one end and support receptacles 148 on the other end. Hot oil lines 145 run from the journal 42 through the beams 146 and up to the upper end of the receptacles 148 where they are attached to nozzles 149. The receptacles 148 are upright (the longer axis is vertical) and open at the top so that a food product 12 such as an egg roll can be placed within the receptacle 148. In this embodiment the oil container 22 catches any hot oil that spills over at the top of the receptacles 148 as the receptacles 148 are rotated in the microwave field 32.

Figure 6:
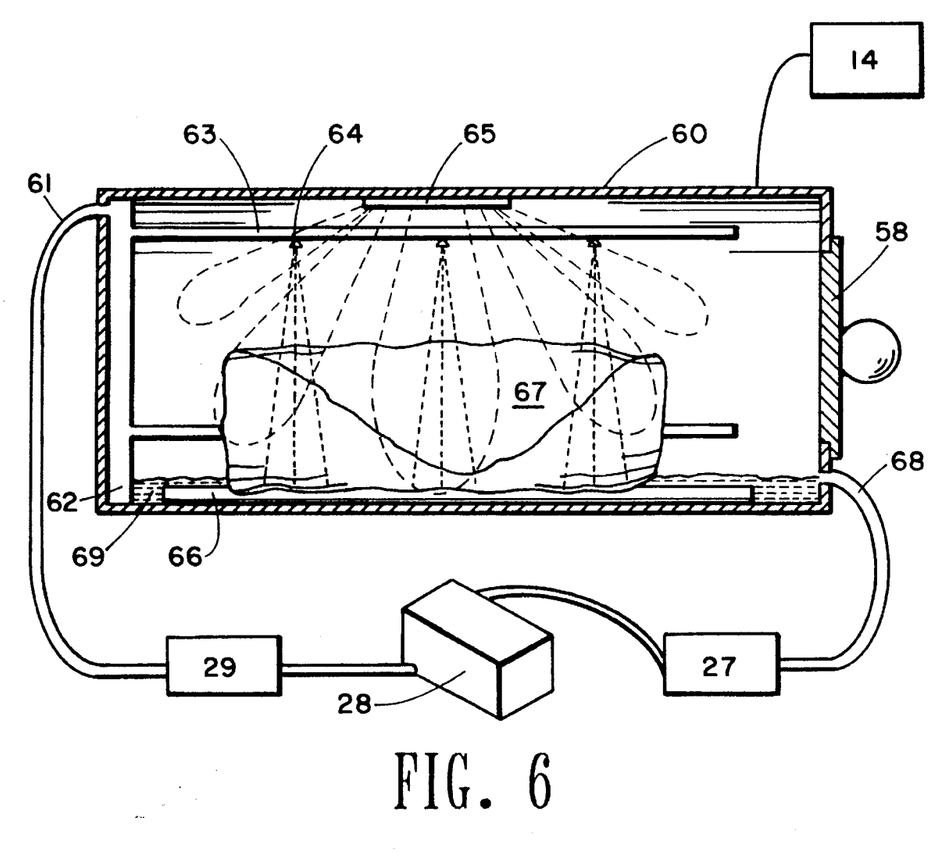
FIG. 6 is an elevational view of another embodiment of an apparatus which can be used in the system of the invention.
Figure 7:
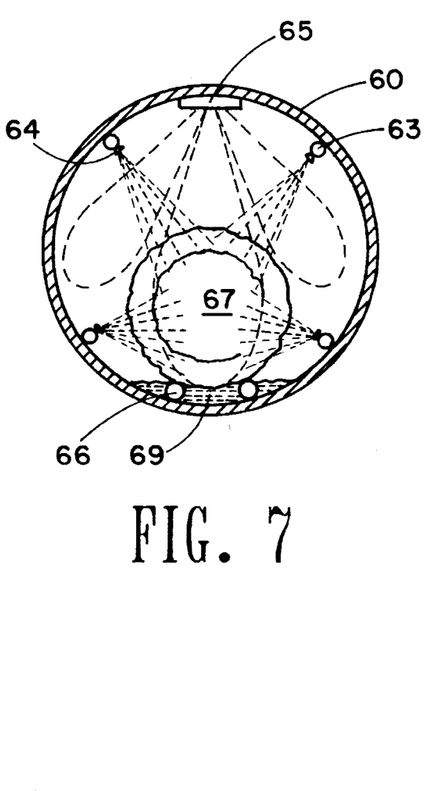
FIG. 7 is an end view of the embodiment shown in FIG. 6.

Referring to FIGS. 6 and 7, an individualized food product heating oven or chamber 60 which may be in any configuration is shown. In this embodiment, a hot oil feed line 61 is introduced into a hot oil manifold 62 which is connected to a plurality of parallel hot oil feed lines 63. Each hot oil feed line 63 contains one or more spray nozzles 64 as needed to uniformly direct hot oil to the food product 67. The hot oil feed lines 63 are preferably connected to the inside surface of the chamber 60 with each line placed as needed in conjunction with nozzles 64 to uniformly direct hot oil to the food product. A microwave source 65 is connected through the chamber 60. A pair of mounting rods 66 are attached across the lower end within the chamber 60 and they serve as a stand for the food product 67. A hot oil evacuation line 68 is located on the lower end of chamber 60 to drain hot oil 69.

The chamber 60 may be made of metal or some other material suitable to confine the microwave field within the chamber. Food product 67 is inserted into the chamber 60 and is heated by microwaves generated by a microwave emitter/receiver 65 and by hot oil 69. Spray nozzles 64 and the pool of hot oil 69 direct hot oil around the entire surface area of the food product 67. The system contains a filter 27, heater 28, pump 29, and a control system 14.

Figure 8:
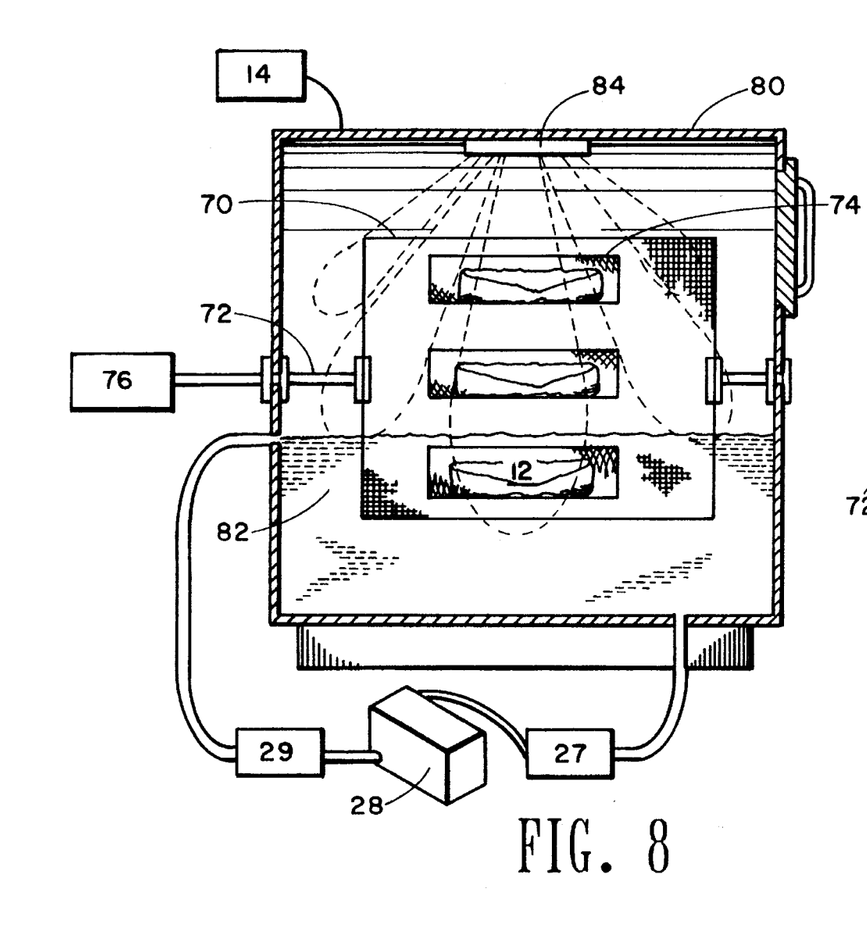
FIG. 8 is an elevational view of another embodiment of an apparatus which can be used in the system of the invention.
Figure 9:
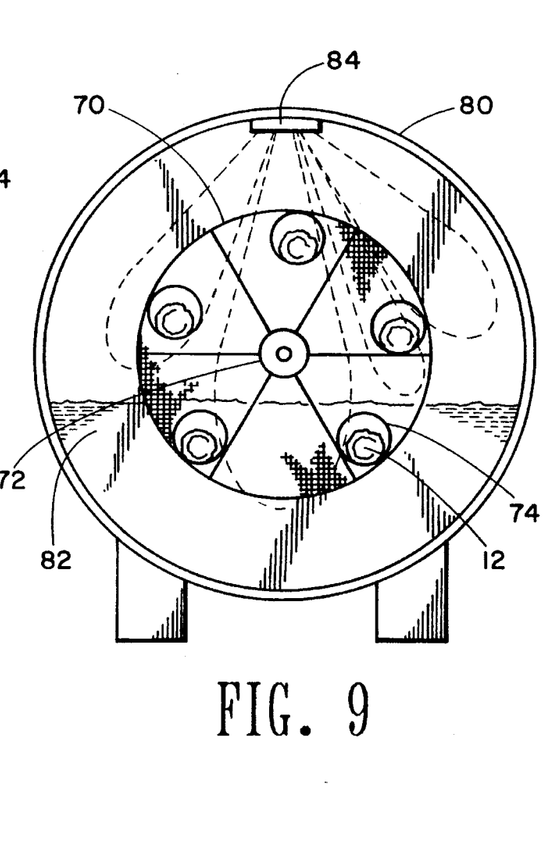
FIG. 9 is an end view of the embodiment shown in FIG. 8.

Referring to FIGS. 8 and 9, another embodiment of the invention is shown in which a perforated cylinder 70 is rotated within an oven or shell 80. The shell 80 is stationary and contains a reservoir or volume 82 of hot oil. The perforated cylinder 70 rotates about a central axis 72. The central axis 72 is supported by bearings 73 in shell 80 and is driven by motor 76. Perforated baskets 74 are mounted within the perforated cylinder 70 such that when the perforated cylinder 70 is rotated about an axis 72 the basket 74 will pass through the volume of hot oil 82. Baskets 74 are constructed of a sufficient size to contain a food product 12 to be heated by the hot oil 82 and microwave source 84.

The system of the present invention may be applied to serve a freshly cooked and/or heated food product such as an egg roll to customers. Prior to cooking and/or heating, the food product may be in a raw or pre-cooked form and may be in a frozen or non-frozen state. In this application, it is desirable to completely cook and/or heat said food product in a short time in order to serve a customer quickly. In order to achieve the rapid and full cooking and/or heating of the food product, the hot oil should be heated to a relatively high temperature range (about 350 to 500 degrees F.). Control system 14 can include a safety shutoff feature to shut off the heater 28 as well as the microwave power when the oil temperature inside the microwave chamber reaches the high limit to prevent a fire and/or burning of the food. The oil temperature inside the apparatus is detected by a temperature sensor 34 located in the hot oil container 21. In order to achieve a rapid and thorough cooking and/or heating, it is preferred to utilize a relatively high intensity microwave field within which the object(s) to be cooked and/or heated are placed. A microwave field is used simultaneously with the application of hot oil to heat the food product 12 in less than a minute, obtaining a crispy (but not burned, sometimes golden-brown) outer crust and to fully and uniformly cook and/or heat the core or filling to a desired temperature which must comply with USDA regulations in the case of a meat or poultry item—for a meat product, the temperature must reach 145 degrees F. or above, for a poultry product it must reach 160 degrees F. or above.

In some applications of the present system, it may be desirable to apply hot oil either shortly before or after microwaving or to stagger starting and stopping times of hot oil application and microwaving. The system could also be constructed with more than one microwave source/receiver to achieve a desired microwave field.

In a recent experiment using the system of the present invention shown in FIG. 1 without the revolving tree 40, a refrigerated raw egg roll was successfully cooked in a much shorter time compared to the time required in a conventional deep frying method adopted in the applicant's egg roll manufacturing plant. This experiment showed that the cooking time required by the applicant's current conventional frying method was reduced by as much as sixty five percent by using the system of the present invention with a moderate microwave power (900 watts) and oil temperature (355 degrees F.). Moreover, if the applicant tried to use the conventional cooking method, namely deep frying, to cook the same raw egg roll from a frozen state, the egg roll would have to be defrosted prior to cooking. Otherwise the egg roll wrapper would be burnt before the egg roll core temperature reaches 160 degrees F. which is required in this particular cooking procedure.

What is claimed is:

1. An apparatus for preparing a food product by heating, comprising:

an oven;

a microwave source/receiver mounted in the oven;

a hot oil system including;
    an oil container set on a bottom of the oven;
    a pool of oil within the oil container;
    a hot oil circulation system;

a control system connected to the apparatus for monitoring and regulating a hot oil temperature and a heating time, as well as for initiating a safety shutdown;

a revolving tree for holding the food product including:
    a motor;
    a drive shaft extending through the oil container having a hub on an upper end, the drive shaft being driven by the motor;
    a plurality of rollers having a non-stick surface connected to the hub in a near radial direction and extending horizontally over the oil container, where the rollers are grouped in a series of pairs to hold the food product;
    an extension drive shaft connected to the top of the hub and extending above the hub;
    a plurality of poles extending horizontally and radially from the top end of the extension shaft wherein each of the poles are positioned above each of the groups of the rollers, respectively;
    a plurality of nozzles mounted on each of the poles; and
the hot oil circulation system further including a hot oil line running through the drive shaft, the hub, the extension shaft and branching out in to each of the poles to feed hot oil to the nozzles.

2. An apparatus for preparing a food product by heating, comprising:

an oven;

a microwave source/receiver mounted in the oven;

a hot oil system including;
    an oil container set on a bottom of the oven;
    a pool of oil within the oil container;
    a hot oil circulation system;

a control system connected to the apparatus for monitoring and regulating a hot oil temperature and a heating time, as well as for initiating a safety shutdown;

a revolving tree for holding the food product including:
    a motor;
    a drive shaft extending through the oil container having a hub on an upper end, the drive shaft being driven by the motor;
    a plurality of beams which extend radially from the hub;
    a plurality of receptacles, one each mounted on an end of each of the beams wherein each of the receptacles is mounted such that a longer axis is in a vertical direction and the receptacle has an open end at a top of the container; and the hot oil circulation system further including a hot oil line running through the drive shaft, the hub, branching out into each of the beams and connecting to the receptacles.

3. An apparatus for preparing a food product by heating, comprising:

an oven;

a microwave source/receiver mounted in the oven;

a hot oil system including;
    an oil container set on a bottom of the oven;
    a pool of oil within the oil container;
    a hot oil circulation system;

a control system connected to the apparatus for monitoring and regulating a hot oil temperature and a heating time as well as for initiating a safety shutdown; and wherein the hot oil system further includes a manifold connected to the line running to the oven; and a plurality of hot oil feed lines connected to the manifold and attached to an inside surface of the oven with each of the hot oil feed lines including at least one spray nozzle.

4. An apparatus for preparing a food product by heating, comprising:

an oven;

a microwave source/receiver mounted in the oven;

a hot oil system including;
 an oil container set on a bottom of the oven;
 a pool of oil within the oil container;
 a hot oil circulation system;

a control system connected to the apparatus for monitoring and regulating a hot oil temperature and a heating time, as well as for initiating a safety shutdown;

an axis running through the oven supported at two opposite ends of the oven;

a motor connected to the axis for rotating the axis;

a perforated cylinder attached to the axis inside the oven for rotating the perforated cylinder within the oven; and a plurality of perforated baskets mounted within the perforated cylinder.

* * * * *